INVENTORS
Michael A. Costantini
Jalal T. Salihi
BY
C. R. Meland
THEIR ATTORNEY

INVENTORS
Michael A. Costantini
Jalal T. Salihi
BY
C. R. Meland
THEIR ATTORNEY

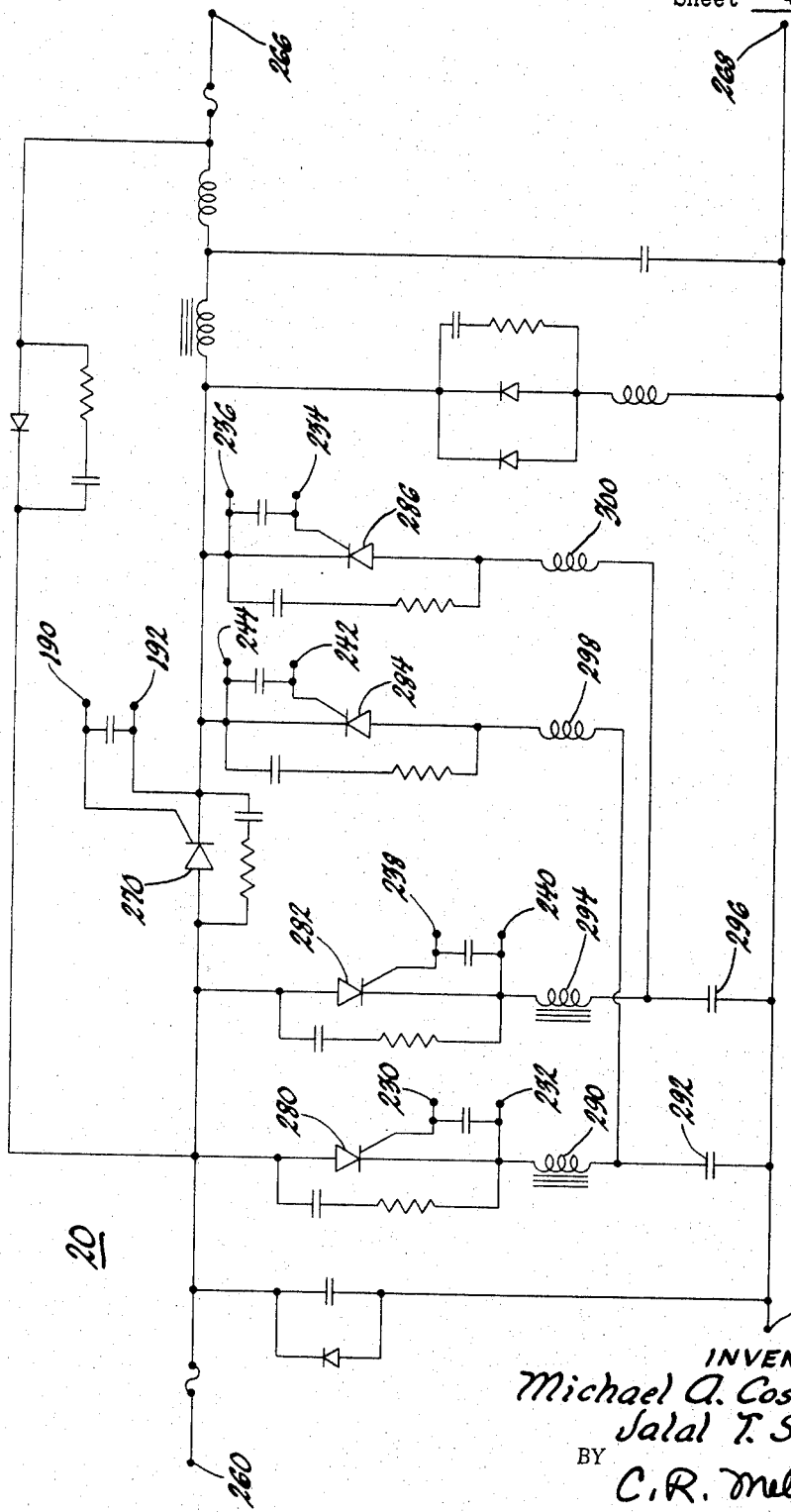

United States Patent Office 3,419,818
Patented Dec. 31, 1968

3,419,818
PULSE FREQUENCY AND PULSE WIDTH
CONTROL FOR A MODULATOR
Jalal T. Salihi, Santa Barbara, and Michael A. Constantini, Santa Monica, Calif., assignors to General Motors Corporation, Detroit, Mich., a corporation of Delaware
Filed May 20, 1965, Ser. No. 457,373
18 Claims. (Cl. 332—9)

ABSTRACT OF THE DISCLOSURE

This invention relates to a driver or trigger circuit for a pulse modulator that controls the voltage applied to an induction motor from a source of direct current. The trigger circuit includes a variable frequency square wave generator which controls a pulse frequency control circuit and the output frequency of a pulse width control circuit. The trigger circuit has a gate circuit for preventing operation of the pulse width control circuit until the output frequency of the square wave generator attains a predetermined value. The trigger circuit for the modulator includes fast rise trigger circuits for gating controlled rectifiers which are a part of the modulator. The induction motor can be utilized to propel a motor vehicle.

---

Figure 1:
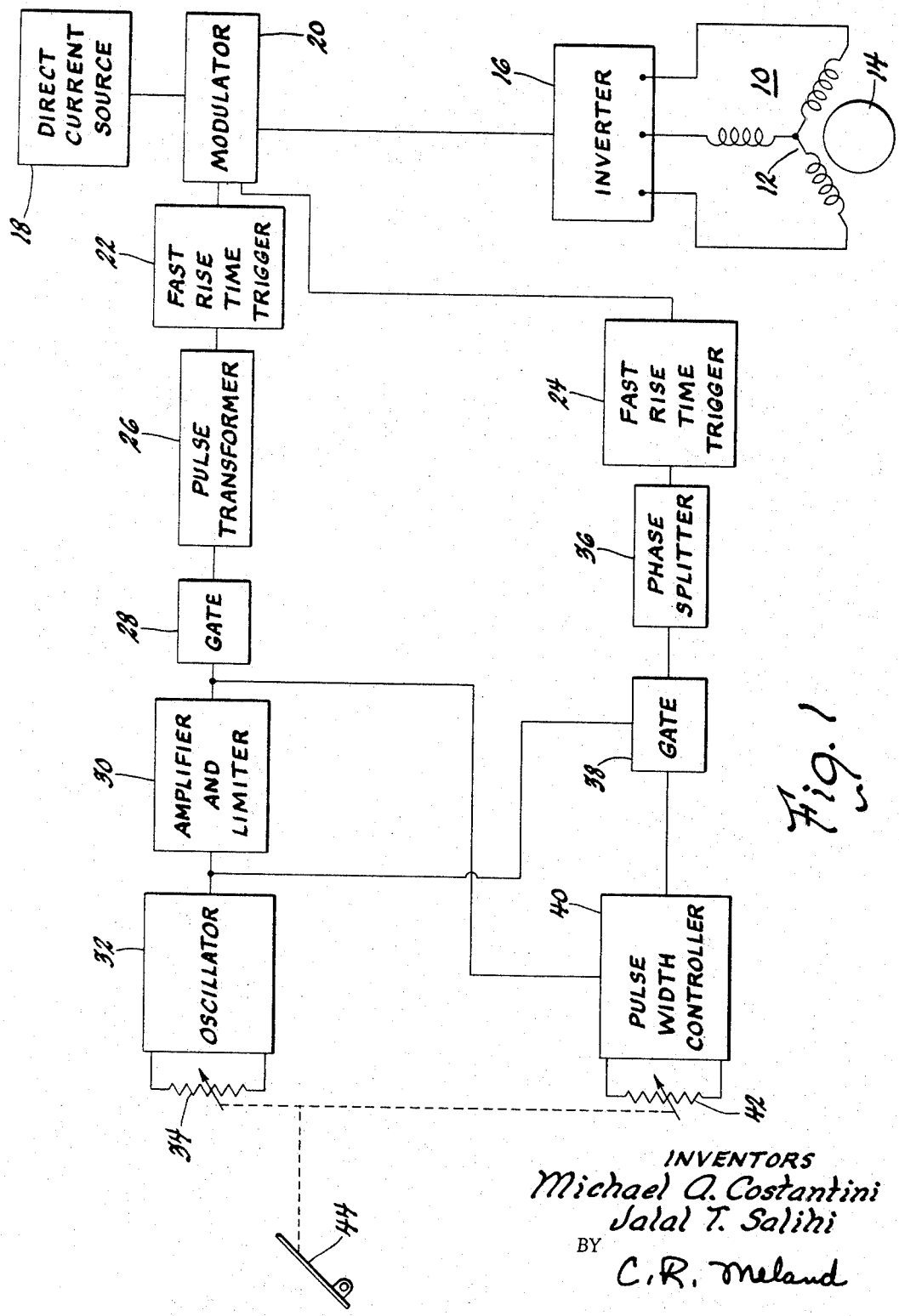

This invention relates to a trigger circuit for a modulator and more particularly to a trigger circuit for a modulator that can be used to feed an inverter.

One of the objects of this invention is to provide a trigger circuit for a modulator that is capable of developing signals to provide either pulse frequency control or pulse width control of a modulator.

Another object of this invention is to provide a trigger circuit that is suitable for driving a modulator such that for a fixed direct current voltage applied to the modulator, the output of the modulator may be controlled from zero to maximum by pulse frequency control, pulse width control or a combination of both pulse frequency and pulse width control.

Another object of this invention is to provide a trigger circuit for a modulator that controls the voltage applied to an induction motor through an inverter.

A further object of this invention is to provide a trigger circuit for a modulator that is capable of controlling the modulator and therefore the power applied to an electric motor that is used to propel a vehicle.

S.ill another object of this invention is to provide a trigger circuit for an electrical system that powers a vehicle wherein the trigger circuit is capable of supplying both pulse frequency control information and pulse width control information as a function of the setting of a manually operable device such as an accelerator pedal.

Another object of this invention is to provide a fast rise trigger circuit for a controlled rectifier inverter.

Still a further object of this invention is to provide a trigger circuit for a modulator that includes a magnetic amplifier and means are provided for blocking the output of the magnetic amplifier until the frequency of the input to the magnetic amplifier exceeds a certain value, for example, 500 cycles per second.

Still a further object of this invention is to provide a trigger circuit for a modulator which includes an oscillator and wherein a gate circuit is provided which will not permit an output from the trigger circuit during starting of the oscillator.

Further objects and advantages of the present invention will be apparent from the following description, reference being had to the accompanying drawings wherein preferred embodiments of the present invention are clearly shown.

In the drawings:

FIGURE 1 is a block diagram illustration of a trigger circuit for a modulator shown connected with the modulator and inverter of a motor power supply system.

Figure 2:
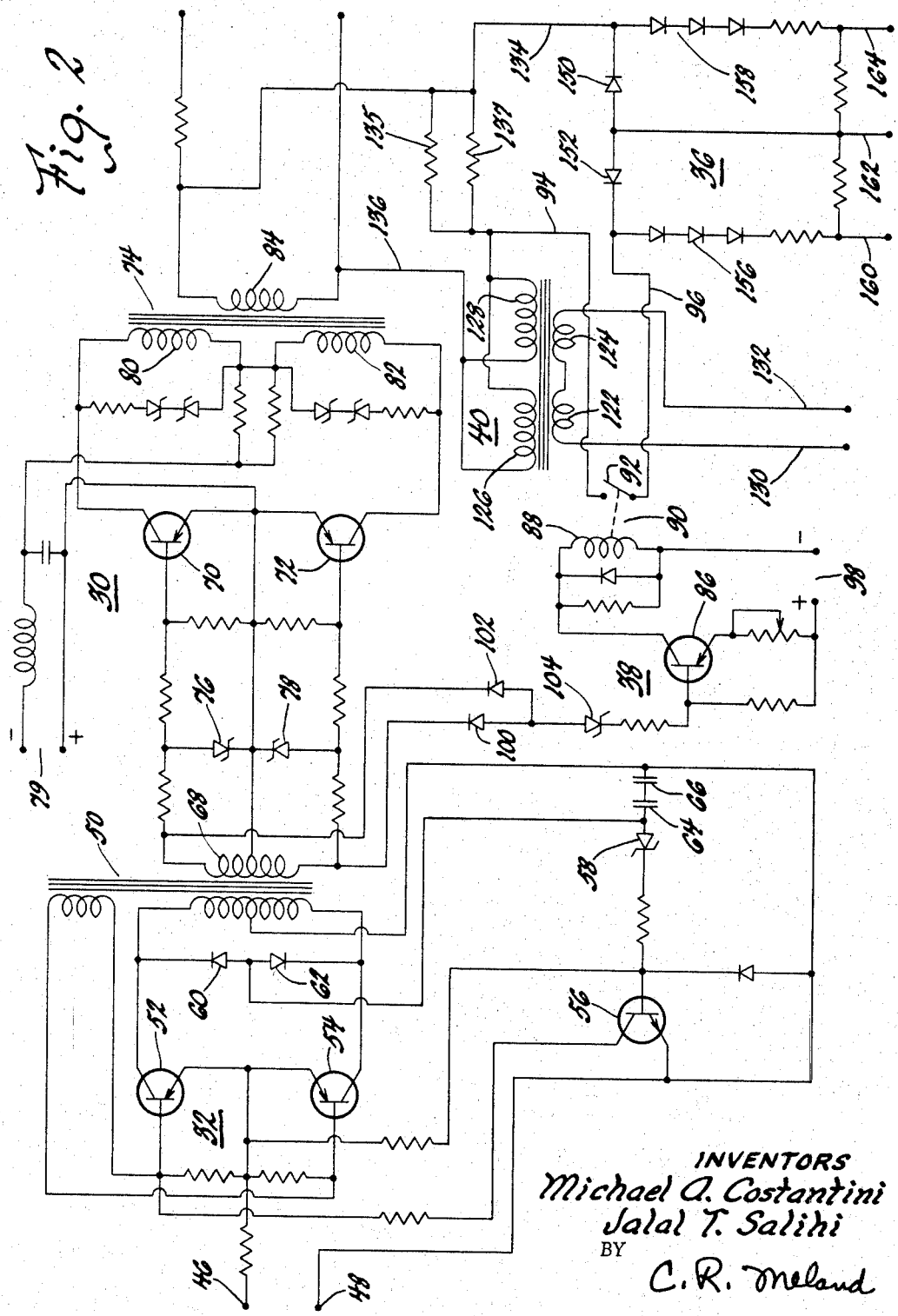
Figure 3:
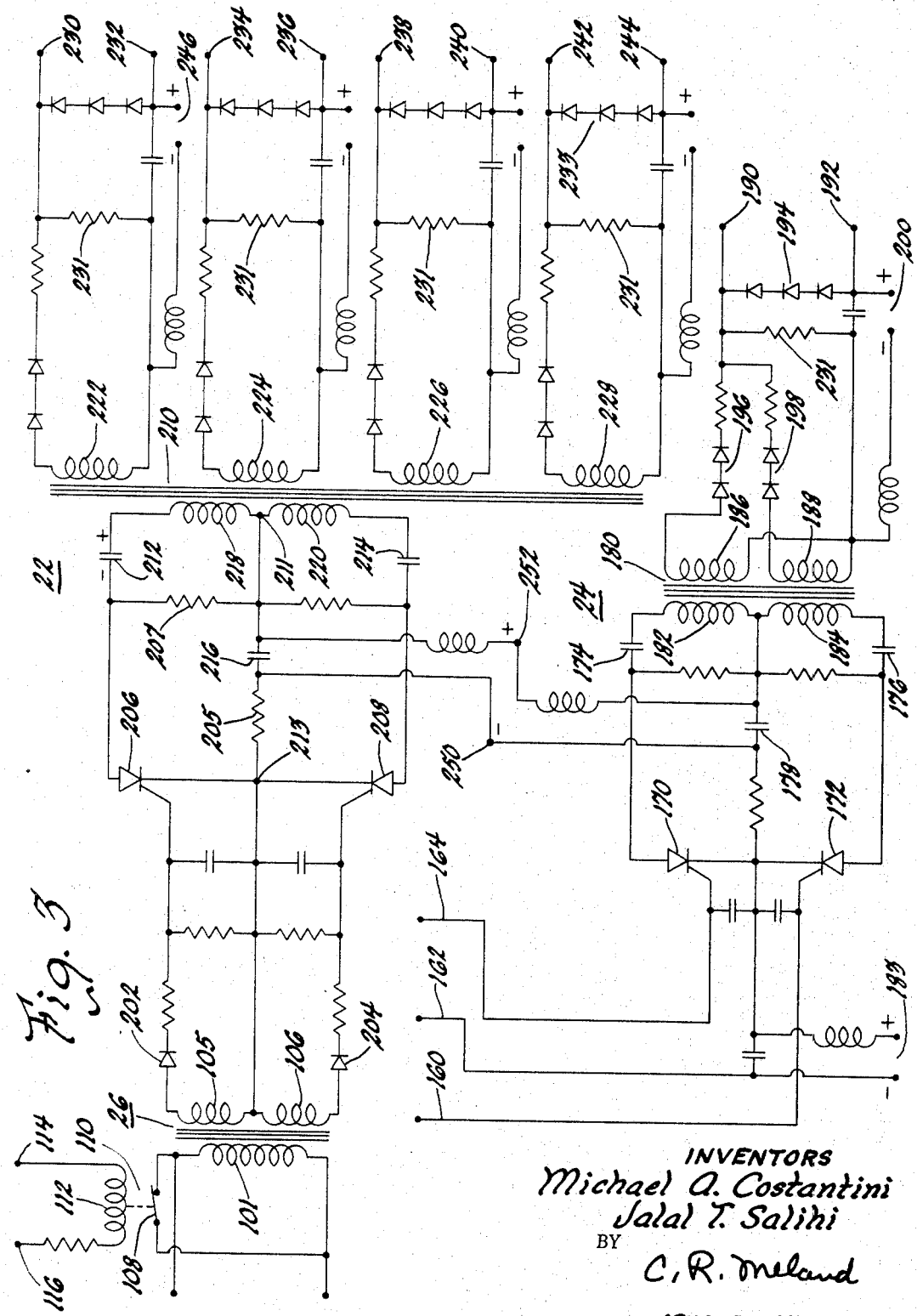

FIGURES 2 and 3 taken together illustrate the trigger circuit shown in FIGURE 1 and also illustrate the fast rise trigger circuits for a modulator.

FIGURE 4 is a schematic circuit diagram of a modulator that is triggered by the trigger circuit shown in FIGURES 2 and 3.

Referring now to the drawings and more particularly to FIGURE 1, the reference numeral 10 designates an induction motor having a three phase Y-connected stator winding 12 and a rotor 14. The rotor 14 is adapted to drive a load and may be used, for example, to propel a vehicle such as a passenger car.

The three phase winding 12 is connected with an inverter 16 which is capable of sequentially energizing the phase windings of the stator winding 12 from a source of direct current. Although the inverter can take various forms, it is preferred that it be of the type shown in patent application Ser. No. 457,386, filed on May 20, 1965, and now Patent 3,354,370, and assigned to the assignee of this invention.

The inverter 16 is fed from a source of direct current 18, through a modulator 20. The modulator has a square wave output and is controlled by the trigger circuit of this invention to vary the input voltage applied to the inverter 16.

The switching of the controlled rectifiers of the inverter 16 can be controlled in a manner illustrated in patent application Ser. No. 295,954, filed on July 18, 1963, and now Patent 3,323,032. Thus, the triggering of the controlled rectifiers in the inverter can be controlled such that the frequency of the current pulses applied to the three phase winding 12 is a function of a frequency which is a summation of motor speed and another frequency provided by an oscillator. This provides an arrangement where the slip of the motor 10 can be controlled and maintained constant but adjustable by adjusting oscillator frequency.

The modulator 20 is adapted to be triggered by a pulse frequency control signal or by a pulse width control. To this end, the modulator 20 is connected with fast rise trigger circuits 22 and 24. The fast rise trigger circuit 22 provides pulse frequency control and is connected with a pulse transformer 26. The pulse transformer is connected with a gate 28 which controls the connection of pulse transformer 26 and an amplifier and limiter 30. The amplifier and limiter 30 is connected with an oscillator 32. The input to the oscillator is controlled by a variable resistor 34.

The fast rise trigger 24 is connected with a phase splitter 36. The gate 38 is connected between a pulse width controller 40 and the phase splitter 36. The gate 38 is connected between the oscillator 32 and the amplifier and limiter 30. The pulse width controller 40 is connected with the output of the amplifier and limiter 30 and is connected with a variable resistor 42.

Where the electrical system shown in FIGURE 1 is used to control a motor power supply system where the motor propels a vehicle, the resistors 34 and 42 can be controlled by an accelerator pedal 44 that is connected with the resistors through a suitable mechanical linkage shown in dotted lines. The mechanical linkage is of such a type that resistor 34 is actuated when the accelerator pedal is initially depressed and is arranged such that during actuation of resistor 34, the resistor 42 is not actuated. The resistor 34 controls the pulse frequency control portion of the trigger circuit while the resistor 42, when actuated, controls the pulse width control portion of the trigger circuit. In other words, as the accelerator pedal is initially depressed, the modulator 20 will receive pulse frequency control signals but after a predetermined movement of the accelerator pedal 44, the pulse width controller begins to operate to provide pulse width control for the modulator 20 when resistor 42 is actuated.

It will, of course, be appreciated by those skilled in the art that other control arrangements could be provided for sequentially bringing into operation the pulse frequency control and the pulse width control by means of a manually operable actuator.

Referring now more particularly to FIGURES 2 and 3 which when taken together illustrate the trigger circuit of this invention and the fast rise trigger circuit for the modulator, the reference numeral 32 generally designates the oscillator shown in FIGURE 1. This oscillator can take various forms but must be of a type that has a square wave output composed of switching components where both the frequency and amplitude of the output is proportional to the direct current control voltage applied to input terminals 46 and 48. The variable direct current applied to input terminals 46 and 48 can be provided by the variable resistor 34 shown in FIGURE 1 which would be connected in series with a source of direct current so as to apply a variable voltage to input terminals 46 and 48 as resistor 34 is adjusted. The oscillator 32 includes a saturable transformer 50 and two PNP switching transistors 52 and 54. The oscillator also includes NPN transistor 56, Zener diode 58 and diodes 60 and 62 connected as shown in FIGURE 2. The oscillator circuit further includes the capacitors 64 and 66 which are used in the starting circuit and which are operative to insure oscillation at all working voltage levels.

The output from the oscillator circuit 32 is taken across the center tapped secondary winding 68 of the transformer 50. This output will be an alternating rectangular wave, the frequency and amplitude of which will be proportional to the voltage applied across input terminals 46 and 48. In other words, an alternating square wave is induced in secondary winding 68 which has a frequency and amplitude which is proportional to the input voltage applied across terminals 46 and 48.

The amplifier and limiter 30 shown in FIGURE 1 is generally designated by reference numeral 30 in FIGURE 2. This circuit is fed from the secondary winding 68 and includes PNP transistors 70 and 72. In addition, the amplifier and limiter 30 includes an isolating transformer 74. The amplifier and limiter also has Zener diodes 76 and 78 which limit the input to transistors 70 and 72. The Zener diodes which are connected across the primary windings 80 and 82 of the transformer 74 are used to protect transistors 76 and 78.

The amplifier limiter 30 will provide an output at secondary winding 84 of the transformer 76 which has a fixed amplitude and a variable frequency which is a function of the output frequency of the oscillator 32. The frequency of the current developed in secondary 84 is therefore proportional to the voltage applied to terminals 46 and 48. It therefore is seen that the voltage appearing across secondary winding 84 has a fixed amplitude but a variable frequency which is proportional to the voltage appearing across input terminals 46 and 48. The amplifier and limiter 30 is connected with terminals 79 which are connected with a source of direct current.

The system of FIGURE 2 includes the gate circuit generally designated by reference numeral 38. This gate circuit includes a PNP transistor 86 having its emitter-collector circuit connected in series with a relay coil 88 of relay 90. The relay 90 includes a normally open contact 92 controlling the connection of conductors 94 and 96. The relay coil can be energized from terminals 98 which are connected with a source of direct current (not illustrated).

The conduction of transistor 86 is controlled by a circuit that is connected across center tapped secondary winding 68 of the transformer 50. This circuit includes diodes 100 and 102 and a Zener diode 104.

The output voltage of the secondary winding 68 is rectified by the diodes 100 and 102 and this voltage is compared with the voltage of the Zener diode 104. The direct current output voltage which is applied to the base of transistor 86 will be proportional to frequency and when the frequency of the output voltage of secondary winding 68 is above a predetermined value, for example, 500 cycles per second, the transistor 86 will be turned on in its emitter-collector circuit. This will complete a circuit for the relay coil 88 from direct current input terminals 98 and the contact 92 will now close to connect conductors 94 and 96. As will be more fully described hereinafter, the closing of relay contact 92 connects the output of a magnetic amplifier to the load. This action restricts the range of magnetic amplifier operation to a frequency above 500 cycles per second, thus making the size of the magnetic amplifier smaller and its design simpler.

The secondary winding 84 of transformer 74 is connected with the primary 100 of pulse transformer 26. The transformer 26 has secondary windings 104 and 106. It is seen that a relay contact 108 is connected with a circuit which shorts the primary 100 when the relay contact 108 is closed. This relay contact is part of a relay designated by reference numeral 110 and including the relay coil 112. The relay coil 112 can be energized from an external control circuit which is not illustrated but which would be connected with terminals 114 and 116. The relay contact is normally closed to short the primary winding 100 but when the terminals 114 and 116 are energized from an external circuit the relay coil 112 is energized to cause the contact 108 to move to an open position.

The purpose of the gate 28 (relay 110) is to prevent trigger pulses from being applied to the modulator during the time that the oscillator 32 is started. This is necessary since during starting, the oscillator 32 undergoes irregular transients causing an irregular sequence of trigger pulses which must be prevented from appearing across the output of the circuit shown in FIGURES 2 and 3 during starting of the oscillator. After the oscillator starts, the relay coil 112 is energized to open the short circuit around primary winding 100.

The pulse width controller 40 as illustrated schematically in FIGURE 2 includes a magnetic amplifier having control windings 122 and 124 and has gate windings 126 and 128. The control windings 122 and 124 are connected across conductors 130 and 132 and these conductors receive an input signal from a circuit that includes the variable resistor 42. This circuit can include a source of direct current connected in series with the resistor and arranged such that the current flow through control windings 122 and 124 is a function of the setting of the variable resistor 42.

The gate winding 126 is connected with conductor 94 and with a conductor 134 through resistors 135 and 137. This gate winding is also connected with conductor 136 and this conductor is connected to one side of secondary winding 84 of transformer 74. The conductor 134 is connected to the opposite side of the secondary winding 84.

The gate winding 128 is connected between conductor 136 and conductor 94 and is connected to the conductor 134 through resistors 135 and 137.

The phase splitter 36 comprises diodes 150, 152 and the series connected diodes 156 and 158. The phase splitter rectifies the output of the magnetic amplifier and this output is applied to conductors 160, 162 and 164. The series connected diodes 156 and 158 are used to prevent the magnetizing current of the magnetic amplifier from appearing at the output.

The output of the phase splitter 36 is applied to the fast rise time trigger circuit 24. This circuit includes controlled rectifiers 170 and 172, capacitors 174, 176 and 178 and a pulse transformer 180 having primary windings 182 and 184 and secondary windings 186 and 188. A source of direct current is connected with terminals 183. The secondary windings 186 and 188 feed output terminals 190 and 192. A plurality of diodes 194 are connected across the output terminals 190 and 192 and pairs of diodes 196 and 198 are provided for rectifying the output of the secondary windings 186 and 188. The output circuit has terminals 200 that are connected with a suitable source of direct current which is not illustrated.

The output appearing across secondary windings 104 and 106 of pulse transformer 26 is rectified by diodes 202 and 204 and this signal is applied to the fast rise trigger circuit 22. It will be appreciated from an inspection of the drawings that the fast rise trigger circuit 22 is substantially identical with the fast rise trigger circuit 24 with the exception that there are four secondary windings included in the trigger circuit 22. The trigger circuit 22 includes controlled rectifiers 206 and 208, transformer 210 and capacitors 212, 214 and 216.

The transformer has primary windings 218 and 220 and a plurality of secondary windings 222, 224, 226 and 228. The secondary windings 222 through 228 respectively feed terminals 230 and 232, 234 and 236, 238 and 240, and 242 and 244. It is seen that the circuits fed by the secondary windings 222 through 228 include rectifying diodes and diodes connected across the output terminals. Each of the secondary circuits is fed from a source of direct current (not illustrated) which is connected, for example, with terminals 246 for secondary winding 222. The other secondary circuits have terminals similar to terminals 246 that are connected with suitable sources of direct current.

The primary side of the trigger circuits 22 and 24 are energized from a source of direct current connected across terminals 250 and 252.

The output of the fast rise by trigger circuits 22 and 24 is applied to a modulator which is illustrated schematically in FIGURE 4. This modulator is the subject matter of patent application Ser. No. 457,374, filed on May 20, 1965, which is now abandoned, and assigned to the assignee of this invention.

The modulator shown in FIGURE 4 includes input terminals 260 and 264 which are connected with the source of direct current 18. The output terminals of the modulator are designated by reference numerals 266 and 268 and these are used to feed the inverter 16.

The modulator includes a controlled rectifier 270 connected in series between input terminal 260 and output terminal 266. The controlled rectifier 270 has its gate and cathode connected respectively with terminals 190 and 192 of fast rise trigger 24. It therefore is seen that the output of the fast rise trigger 24 will control the conduction of the controlled rectifier 270.

The modulator of FIGURE 4 further includes controlled rectifiers 280, 282, 284 and 286. The gate and cathode circuits of these controlled rectifiers are connected respectively with the output terminals of the fast rise trigger circuit 22. It therefore is seen that controlled rectifiers 280, 282, 284 and 286 will be triggered in accordance with the signals developed at the output terminals of the trigger circuit 22.

Controlled rectifier 280 is connected in series with an inductor 290 and a capacitor 292. The controlled rectifier 282 is connected in series with inductor 294 and capacitor 296. The controlled rectifier 286 is connected in series with conductor 300.

The operation of the modulator shown in FIGURE 4 is more fully described in the above mentioned patent application Ser. No. 457,374, filed concurrently herewith. As described in that application, the capacitors 292 and 296 are periodically charged through controlled rectifiers 280 and 282 and are discharged sequentially through controlled rectifiers 284 and 286. The discharging of the capacitors 292 and 296 performs two functions. Thus, when controlled rectifier 270 is not being switched to a conductive condition, the discharge pulses from capacitors 292 and 296 are applied to the electrical load through output terminals 266 and 268. When controlled rectifier 270 receives signals to turn it on from trigger circuit 24, the discharging of capacitors 292 and 296 provide turn-off pulses for controlled rectifier 270.

The operation of the system for triggering the modulator 20 will now be described. As has been pointed out above, the accelerator pedal 44 is coupled to the resistors 34 and 42 in such a manner that initial depression of the accelerator pedal will cause a change in the resistance of resistor 34 to change the output frequency of the oscillator 32. When the accelerator pedal has been depressed a predetermined amount, the resistor 34 is no longer shifted and the output frequency of the oscillator remains constant. Up to this point, the modulator is controlled by pulse frequency control. When the point is reached where resistor 34 no longer changes its resistance, the resistor 42 comes into operation to provide pulse width control.

As was pointed out hereinbefore, the oscillator 32 is a square wave oscillator and the frequency and amplitude of its output is proportional to the voltage applied across input terminals 46 and 48.

The amplifier and limiter 30 amplifies the output of the oscillator 32 but limits its peak amplitude to a fixed value. The output of the amplifier and limiter which is applied to the pulse transformer 26 is therefore a square wave of fixed amplitude and a variable frequency which is equal to the oscillator frequency and proportional to the input voltage applied to terminals 46 and 48.

The pulse transformer 26 applies the output of the amplifier and limiter to the fast rise trigger circuit 22. When a trigger pulse is applied, for example, to controlled rectifier 206 from the pulse transformer 26, this controlled rectifier will be turned on and the capacitor 216 which has been charged to the voltage of the source feeding terminals 250 and 252 will discharge through primary winding 218, capacitor 212, controlled rectifier 206 and resistor 205. This produces a sharp pulse of current in the secondary windings 222 through 228 of transformer 210 limited only by the reflected impedance of the secondaries in series with the small resistance 205. The capacitor 212 will now be charged to source voltage and controlled rectifier 206 continues to conduct a current which is limited by the resistor 207 and resistor 205 to keep capacitor 212 charged. The resistor 205 may be approximately 2.7 ohms while the resistor 207 can be approximately 150 ohms.

When a trigger pulse is now applied to controlled rectifier 208 from pulse transformer 26, the initial pulse of current flowing from capacitor 216 through controlled rectifier 208, capacitor 214, and primary winding 220 drops the potential between junction 211 and the junction 213 to a value much below the supply voltage coming from terminals 250 and 252. As a result, the voltage across capacitor 212 being approximately equal to the supply voltage appearing between junctions 250 and 252 shuts off the controlled rectifier 206. The capacitor 212 then begins to discharge through the primary of transformer 210 and the 150 ohm resistor thus making the circuit ready for the next cycle.

The primary windings 218 and 220 and the secondary windings 222, 224, 226 and 228 of transformer 210 are wound with such a polarity that signals are developed at output terminals 230 and 232 and 234 and 236 when one primary winding is energized and at output terminals 238 and 240 and 242 and 244 when the other primary winding is energized.

The fast rise trigger circuits 22 and 24 provide a negative bias to the controlled rectifiers of the pulse modulator shown in FIGURE 4. Thus, the resistors 231 and the other secondary circuits of the triggers 22 and 24 provide a path for the return of negative bias.

The diodes 233 and its counter parts which are connected across the output terminals of the trigger circuit 22 limit the magnitude of the negative bias voltage and also serve to limit transients which may be fed from the pulse modulator of FIGURE 4 into the trigger circuit of FIGURE 3.

The output of the amplifier and limiter 30 is fed to the pulse width controller 40 shown in FIGURES 1 and 2. This pulse width controller as shown in FIGURE 2 is a magnetic amplifier. This magnetic amplifier in essence consists of two identical saturable transformers comprised of gate windings 126 and 128 and control windings 122 and 124. The gate windings 126 and 128 of the two transformers are paralleled and connected in series with the load to the square wave voltage input supplied by the amplifier and limiter 30. As pointed out hereinbefore, the control windings 122 and 124 receive a control current which is dictated by the setting of resistor 42.

The magnetic amplifier 120 behaves as a current transformer such that the half cycle average output current is proportional to the DC control current in conductors 130 and 132. Since the half cycle average output current is proportional to the control current, the conduction angle of the magnetic amplifier is proportional to the direct current control current applied to conductors 130 and 132. The output of the magnetic amplifier is applied to the phase splitter 36 and the output of this circuit feeds the fast rise time trigger circuit 24. The fast rise time trigger circuit operates substantially in the same manner as the fast rise trigger circuit 22 and controls the controlled rectifier 270 of the modulator shown in FIGURE 4.

To summarize the entire operation of the system, it can be seen that the modulator 20 is controlled by the trigger circuit of this invention in response to the settings of resistors 34 and 42. The resistor 34 provides pulse frequency control for the modulator and in such a mode of operation, the capacitors 292 and 296 are charged and discharged at a frequency depending upon the setting of resistor 34 and supply energy to the electrical load. When resistor 34 has moved to its extreme position, the output of the oscillator 32 becomes fixed and the pulse width controller 40 now comes into operation when the resistance of resistor 42 is shifted. This provides angle control for the magnetic amplifier 120 which in turn provides angle control to the controlled rectifier 270. The system now will be operated under pulse width control with the capacitors 292 and 296 providing turn-off pulses for controlled rectifier 270. During pulse width control, the input terminal 260 and the output terminal 266 are directly connected whenever controlled rectifier 270 is conductive. During pulse width control, a larger amount of power is of course supplied to the electrical load during pulse frequency control.

While the embodiments of the present invention as herein disclosed constitute preferred forms, it is to be understood that other forms might be adopted.

What is claimed is as follows:

1. An electrical system for supplying trigger pulses to drive a circuit such as a modulator and having both a pulse frequency and pulse width output comprising, a variable frequency oscillator, said oscillator having input terminals adapted to be connected with a direct current control signal, the output of said oscillator being a square wave the frequency and amplitude of which is proportional to the direct current input signal, an amplifier and limiter circuit having an input coupled to the output of said oscillator, the output of said amplifier and limiter circuit being a square wave of fixed amplitude and variable frequency equal to the frequency of the input applied to said amplifier and limiter, output terminals coupled to said amplifier and limiter for providing control signals the frequency of which can be varied in accordance with the direct current signal applied to said oscillator, a pulse width controller, said pulse width controller having an input and an output, the input of said pulse width controller being adapted to be connected with a direct current signal, the width of the output pulses from the output of said pulse width controller being controlled by the direct current signal applied to its input, output terminals coupled with said pulse width controller for providing control signals having a variable width that is a function of the direct current signal applied to said pulse width controller, and means coupling the output of said amplifier and limiter to said pulse width controller whereby the frequency of the pulses of the output of said pulse width controller is determined by the output frequency of said oscillator.

2. The electrical system according to claim 1 where the pulse width controller is a magnetic amplifier having control windings connected with the direct current input terminals of the controller.

3. The electrical system according to claim 1 where the oscillator includes at least one switching transistor and where a gate circuit is provided for preventing an output from said oscillator under predetermined conditions.

4. The electrical system according to claim 1 where a gate circuit is provided that controls the output of said pulse width controller, said gate circuit being responsive to the output frequency of said oscillator.

5. A control system for supplying pulse frequency control and pulse width control signals to a load comprising, an oscillator having input terminals, a first variable direct current signal source connected with said input terminals of said oscillator, said oscillator having a square wave output the amplitude and frequency of which is dependent upon the magnitude of the direct current signal of said first direct current signal source, an amplifier and limiter circuit having an input connected with the output of said oscillator, said amplifier and limiter having an output that is a square wave of variable frequency and substantially constant amplitude, a first output circuit coupled to the output of said amplifier and limiter for supplying pulse frequency control signals to a load, a second variable direct current signal source, a pulse width control means controlled by said second variable direct current signal source, said pulse width control means having a square wave output wherein the width of the output pulses are dependent upon the magnitude of the direct current signal of said second variable direct current signal source, a second output circuit coupled to said pulse width control means for supplying pulse width control signals to a load, and means coupling the output of said amplified and limiter to said pulse width control means whereby the frequency of the output pulses of said pulse width control means is determined by the frequency of the output of said amplifier and limiter.

6. The electrical system according to claim 5 wherein the device to be controlled by said first and second output circuits is a modulator.

7. The electrical system according to claim 5 where the amplifier and limiter is coupled to the first output circuit by means of a pulse transformer.

8. The electrical system according to claim 5 where a gate circuit is provided between said pulse width control means and said second output circuit, said gate circuit being coupled to the output of said oscillator to respond to the output frequency of said oscillator and being operative to connect said pulse width control means and said second output circuit when the frequency of said oscillator is above a predetermined value.

9. The electrical system according to claim 5 where the pulse width control means is a magnetic amplifier having control winding means energized by said second signal source.

10. The electrical system according to claim 5 where said pulse width controller is a magnetic amplifier having gate windings connected between said amplifier and limiter and said second output circuit.

11. The electrical system according to claim 5 where fast rise trigger circuits are connected respectively between said amplifier and limiter and said first output circuit and between said pulse width controller and said second output circuit, each fast rise trigger circuit including a capacitor, a transformer and at least one controlled rectifier.

12. An electrical circuit for providing a first output signal having a controlled frequency and a second output signal having a controlled pulse width comprising, a variable frequency oscillator, a pulse width control means, pulse frequency output terminals connected with said variable frequency oscillator, pulse width output terminals, means connecting the output of said oscillator with said pulse width control means, and means connecting the output of said pulse width control means with said pulse width output terminals, said last-named means including a gate means coupled to said oscillator for preventing the connection of said pulse width control means and said pulse width output terminals until the frequency of said oscillator has reached a predetermined value.

13. The electrical system according to claim 12 where first and second direct current control signals are provided which are connected respectively with input terminals of said oscillator and said pulse width control means.

14. The electrical system according to claim 12 where the pulse width control means is a magnetic amplifier having at least one control winding connected with a direct current signal source.

15. The electrical system according to claim 12 where the oscillator includes a plurality of transistors and a transformer.

16. The electrical system according to claim 12 where the pulse frequency output terminals are connected with the output of the oscillator through a circuit that includes a pulse transformer.

17. A trigger circuit for a power modulator comprising, an oscillator, said oscillator having an input and an output, said oscillator providing an alternating square wave at its output the frequency of which is determined by the magnitude of a direct current signal applied to the input of said oscillator, a first source of variable direct current connected with said input of said oscillator for controlling the frequency of the output of said oscillator, a pulse width controller, said pulse width controller having an input and an output and including means for varying the pulse width of its output in response to the magnitude of a direct current control signal applied to control terminals of said pulse width controller, a second source of variable direct current connected with said control terminals of said pulse width controller, means connecting the output of said oscillator with said input of said pulse width controller, and first and second trigger circuits having inputs connected respectively to the said outputs of said oscillator and said pulse width controller, said first and second trigger circuits being adapted to provide pulse frequency control and pulse width control for a modulator.

18. A trigger circuit for applying a forward bias to the gate and cathode of at least one controlled rectifier comprising, a transformer having first and second primary winding sections and at least one secondary winding, first and second controlled rectifiers, first, second and third capacitors, means connecting said first capacitor between a junction of the cathodes of said controlled rectifiers and a junction of said primary winding sections, a source of direct current, means connecting said source of direct current across said first capacitor, means connecting said second capacitor between the anode of said first controlled rectifier and one end of said first primary winding section whereby said first capacitor, said second capacitor, said first primary winding section and the anode-cathode circuit of said first controlled rectifier are connected in a first series loop circuit, means connecting said third capacitor between the anode of said second controlled rectifier and one end of said second primary winding section whereby said first capacitor, said third capacitor, said second primary winding section and the anode-cathode circuit of said second controlled rectifier are connected in a second series loop circuit, means for sequentially triggering said first and second controlled rectifiers to conductive conditions, first and second resistors, means connecting said first resistor across said first capacitor and the anode-cathode circuit of said first controlled rectifier, and means connecting said second resistor across said first capacitor and the anode-cathode circuit of said second controlled rectifier.

References Cited

UNITED STATES PATENTS

| 3,248,598 | 4/1966 | Walker | 307—88.5 X |
| 3,265,953 | 8/1966 | Wellford | 307—88.5 X |
| 3,302,128 | 1/1967 | Schoemehl et al. | 307—88.5 X |

ROY LAKE, *Primary Examiner.*

LAWRENCE J. DAHL, *Assistant Examiner.*

U.S. Cl. X.R.

332—22; 307—305